(12) United States Patent
Okubo et al.

(10) Patent No.: US 12,077,140 B2
(45) Date of Patent: Sep. 3, 2024

(54) VEHICLE CONTROL SYSTEM

(71) Applicant: HONDA MOTOR CO., LTD., Tokyo (JP)

(72) Inventors: Naoto Okubo, Tokyo (JP); Shigeru Doi, Tokyo (JP); Ryo Koyama, Tokyo (JP); Masahiro Hirota, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 263 days.

(21) Appl. No.: 17/584,853

(22) Filed: Jan. 26, 2022

(65) Prior Publication Data
US 2022/0242377 A1   Aug. 4, 2022

(30) Foreign Application Priority Data
Feb. 1, 2021 (JP) .................. 2021-014252

(51) Int. Cl.
*B60T 8/171* (2006.01)
*B60T 8/172* (2006.01)

(52) U.S. Cl.
CPC .............. *B60T 8/171* (2013.01); *B60T 8/172* (2013.01); *B60T 2201/16* (2013.01); *B60T 2230/04* (2013.01)

(58) Field of Classification Search
CPC ...... B60T 8/171; B60T 8/172; B60T 2201/16; B60T 2230/04
See application file for complete search history.

(56) References Cited

FOREIGN PATENT DOCUMENTS

| JP | 6229878 B2 | * | 11/2017 |
| JP | 6229878 B2 |   | 11/2017 |
| JP | 6229879 B2 |   | 11/2017 |

OTHER PUBLICATIONS

English Machine Translation of JP6229878B2 (Year: 2013).*

* cited by examiner

*Primary Examiner* — Andrew J Cromer
(74) *Attorney, Agent, or Firm* — Armstrong Teasdale LLP

(57) ABSTRACT

The vehicle control system includes a braking force generating device (6, 22) configured to generate a braking force to shift a load of a vehicle to a side of front wheels thereof at an initial stage of a cornering, and a control device (31) configured to control the braking force generated by the braking force generating device. The control device calculates an additional deceleration (Gxadd) according to vehicle state information, calculates a requested fore and aft acceleration (Gxr) according to a requested fore and aft force (Fxr) for the vehicle, calculates a correction coefficient (K) for weakening the additional deceleration according to the requested fore and aft acceleration, corrects the additional deceleration by the correction coefficient, and calculates an additional braking force (Fbadd) to be generated by the braking force generating device according to the corrected additional deceleration.

4 Claims, 11 Drawing Sheets

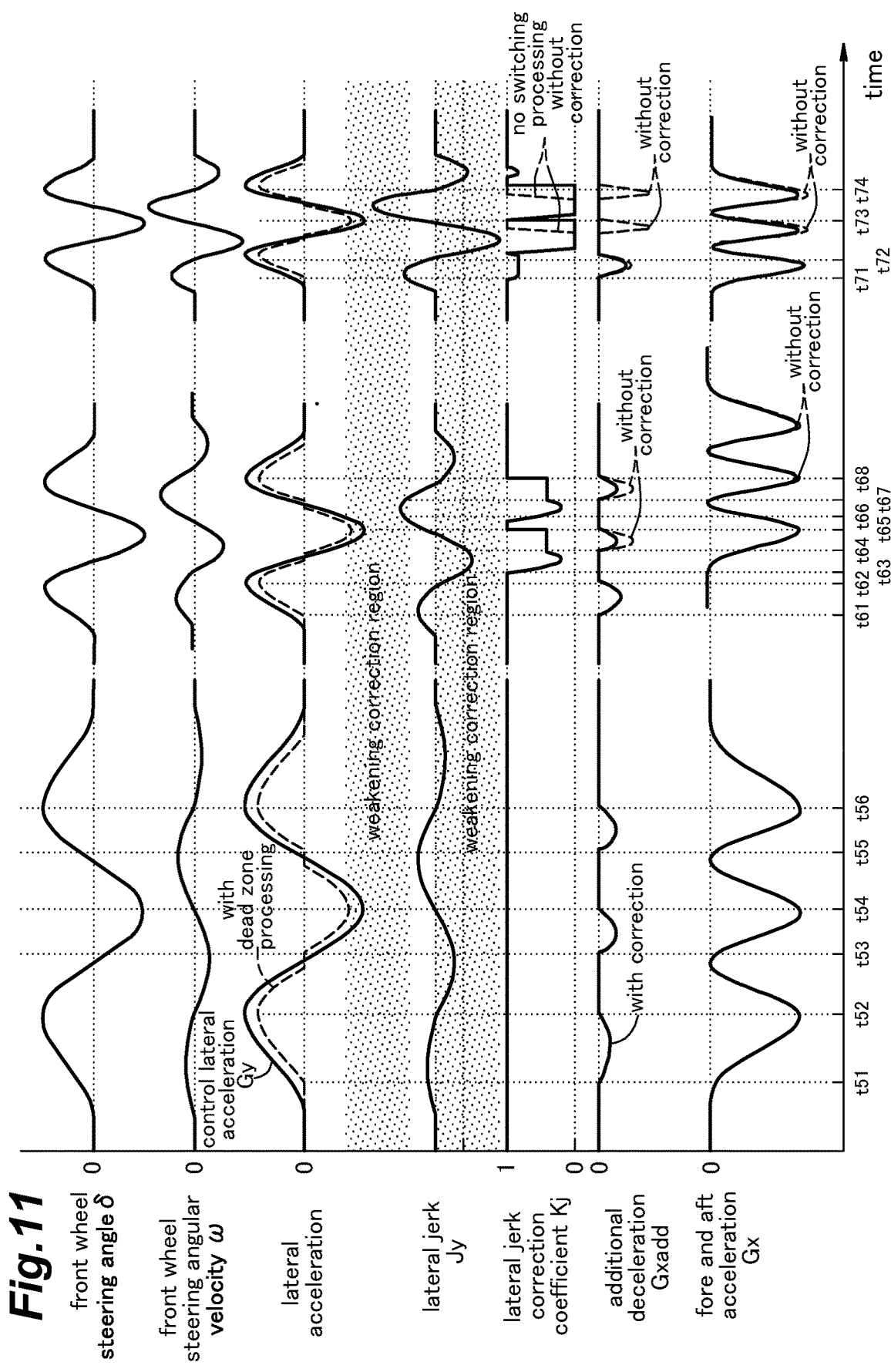

VEHICLE CONTROL SYSTEM

TECHNICAL FIELD

The present invention relates to a vehicle control system that shifts the load of the vehicle to the side of the front wheels in an early phase of a cornering maneuver for an improved handling of the vehicle.

BACKGROUND ART

In a known vehicle control system for improving the cornering performance of a vehicle, a braking force is generated in the front wheels at the start of a cornering operation, without regard to a braking operation of the vehicle operator, so that the load of the vehicle is shifted to the side of the front wheels. Previously proposed vehicle behavior control systems are provided with a driving force reduction amount determining means that increases the driving force reduction amount with an increase in a certain amount associated with the yaw rate, the increase rate diminishing with an increase in this yaw rate associated amount. See JP6229878B2 and JP6229879B2.

However, in such a vehicle behavior control system, when the driver steers the vehicle with the accelerator pedal depressed significantly, the driver may experience some discomfort due to an impression that the brake is dragging due to the overall reduction in the driving force. To overcome this problem, the system disclosed in JP6229878B2 is configured to correct the driving force reduction amount by multiplying a coefficient which decreases in value as the requested driving force increases (by depressing of the accelerator pedal) to the driving force reduction amount determined by the driving force reduction amount determining means.

Also, in such a vehicle behavior control system, when the driver steers the vehicle with the brake pedal depressed significantly, the driver may experience some discomfort due to an impression that the vehicle is decelerating far more severely than requested due to the overall reduction in the driving force. To overcome this problem, the system disclosed in JP6229879B2 is configured to correct the driving force reduction amount by multiplying a coefficient which decreases in value as the requested deceleration increases (by depressing of the brake pedal) to the driving force reduction amount determined by the driving force reduction amount determining means.

However, in regard to improving the cornering performance of a vehicle by adding an additional deceleration to the vehicle, there is a desire to further reduce the discomfort that the driver may experience by the added deceleration of the vehicle.

SUMMARY OF THE INVENTION

In view of such a problem of the prior art, a primary object of the present invention is to minimize the discomfort to the driver when improving the cornering performance of a vehicle by adding an additional deceleration to the vehicle by weakening the deceleration that is applied to the vehicle depending on the magnitude of the requested fore and aft deceleration.

The object of the present invention can be accomplished by providing a vehicle control system (30), comprising: a braking force generating device (6, 22) configured to generate a braking force to shift a load of a vehicle to a side of front wheels thereof at an initial stage of a cornering; a control device (31) configured to control the braking force generated by the braking force generating device; and a vehicle state information acquisition device (33, 34) configured to acquire vehicle state information including at least a traveling speed of the vehicle and a steering angle of the front wheels; wherein the control device includes an additional deceleration calculation unit (43) that calculates an additional deceleration ($Gxadd$) to be generated in the vehicle according to the vehicle state information, a correction coefficient setting unit (46) that calculates a requested fore and aft acceleration ($Gxr$) according to a requested fore and aft force ($Fxr$) for the vehicle, and obtains a correction coefficient ($K$) for weakening the additional deceleration according to the requested fore and aft acceleration, an additional deceleration correction unit (44) that corrects the additional deceleration by the correction coefficient, and an additional braking force calculation unit (45) that calculates an additional braking force ($Fbadd$) to be generated by the braking force generating device according to the additional deceleration corrected by the additional deceleration correction unit.

Thereby, the load of the vehicle is shifted to the side of the front wheels by generating the additional braking force calculated by the control device according to the additional deceleration by using the braking force generating device at the initial stage of cornering so that the cornering performance of the vehicle is improved. In view of the fact that the vehicle driver is more sensitive to the fore and aft acceleration than the fore and aft force, the additional deceleration correction unit corrects the additional deceleration so as to weaken the additional deceleration according to the correction coefficient based on the requested fore and aft acceleration instead of the requested fore and aft force. As a result, the fore and aft acceleration of the vehicle to which the additional deceleration is added at the initial stage of cornering is perceived as natural to the vehicle operator so that any discomfort that may be attributed to the fore and aft acceleration is minimized. Further, freedom in the tuning of the vehicle control system can be improved.

Preferably, the requested fore and aft force ($Fxr$) includes a requested driving force ($Fdr$) that requests acceleration of the vehicle and a requested braking force ($Fbr$) that requests deceleration of the vehicle.

Thereby, the correction coefficient is determined according to the requested fore and aft force that may include both the requested driving force and the requested braking force. As a result, the additional deceleration is appropriately corrected according to the driver's intention to accelerate and decelerate.

Preferably, the requested fore and aft force ($Fxr$) includes an operator-requested fore and aft force ($Fxo$) requested by a driver's operation and a control-requested fore and aft force ($Fxc$) requested by an onboard device.

The correction coefficient is determined from the requested fore and aft force that includes the operator-requested fore and aft force requested by the driver's operation such as pedal operation and the control-requested fore and aft force requested by an onboard device in such a form as an ADAS (Advanced Driver Assistance System) that does not directly depend on the driver operation. As a result, the additional deceleration can be controlled so as to conform to the behavior of the vehicle intended by the vehicle operator.

Preferably, the vehicle state information includes lateral jerk ($Jy$), and the correction coefficient setting unit (46) sets a lateral jerk correction coefficient ($Kj$) as a value that gets smaller as the lateral jerk increases, and corrects the correction coefficient (K) by the lateral jerk correction coefficient.

According to this arrangement, when the driver executes a sudden steering operation while stepping on the accelerator pedal or the brake pedal, the correction coefficient is corrected to a smaller value so that the additional deceleration applied to the vehicle is weakened. As a result, the stability and controllability of the vehicle are ensured.

When correcting the correction coefficient (K) by the lateral jerk correction coefficient, preferably, the correction coefficient setting unit (46) determines if the additional deceleration is zero, and if the additional deceleration is not equal to zero, the correction coefficient is corrected by a smaller of the lateral jerk correction coefficient set based on the lateral jerk and a previous value of the lateral jerk correction coefficient.

Thereby, as a series of additional deceleration values are outputted, the lateral jerk correction coefficient is allowed to change only in the decreasing direction so that the controllability is prevented from being deteriorated by fluctuations in the lateral jerk correction coefficient.

Thus, the present invention can improve the cornering characteristics of the vehicle without causing the vehicle driver to experience discomfort due to the additional deceleration applied to the vehicle for the purpose of improving the cornering characteristics by weakening the additional deceleration according to the requested fore and aft acceleration.

BRIEF DESCRIPTION OF THE DRAWING(S)

FIG. 11 is a time chart showing another example of the changes in the additional deceleration along with various variables associated therewith.

DESCRIPTION OF THE PREFERRED EMBODIMENT(S)

A vehicle control system 30 according to an embodiment of the present invention is described in the following with reference to the appended drawings.

Figure 1:
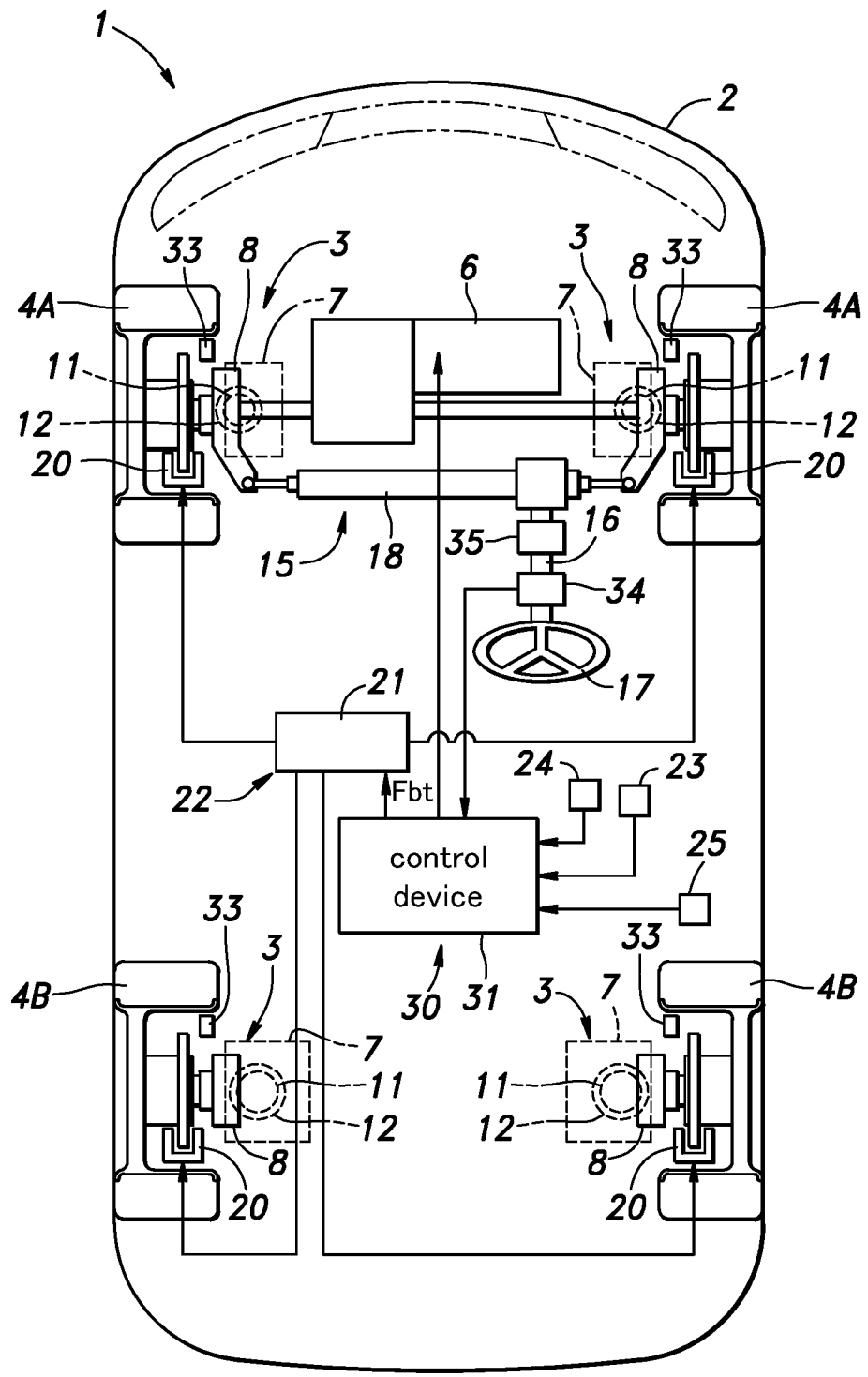
FIG. 1 is a block diagram of a vehicle equipped with a vehicle control system according to an embodiment of the present invention.

FIG. 1 is a schematic diagram of the structure of a vehicle 1 fitted with a vehicle control system 30 according to the present embodiment. As shown in FIG. 1, the vehicle 1 of this embodiment consists of a four-wheeled vehicle including a vehicle body 2 forming the structural frame of the vehicle 1 supporting a pair of front wheels 4A and a pair of rear wheels 4B via respective suspension devices 3.

The vehicle 1 is provided with a power plant 6 that drives the wheels 4 (4A, 4B). The power plant 6 may consist of at least one of an internal combustion engine such as a gasoline engine and a diesel engine and an electric motor. The vehicle 1 of the present embodiment is a front-wheel drive vehicle in which the power plant 6 is a gasoline engine and the driving force and braking force (rotational resistance) of the power plant 6 are transmitted to the front wheels 4A. The power plant 6 is a driving force generating device that generates the driving force that acts on the vehicle 1, and is also a braking force generating device that generates a braking force that acts on the vehicle 1. Alternatively, the vehicle 1 may be a four-wheel drive vehicle or a rear-wheel drive vehicle.

Each suspension device 3 includes a suspension arm 7 pivotally supported by the vehicle body 2, a knuckle 8 supported by the suspension arm 7 to rotatably support the front wheel 4A or the rear wheel 4B, and a spring 11 and a damper 12 provided between the vehicle body 2 and the suspension arm 7.

The vehicle 1 is provided with a steering device 15 that steers the front wheels 4A. The steering device 15 includes a steering shaft 16 rotatably supported by the vehicle body 2 around an axis thereof, a steering wheel 17 provided at the upper end of the steering shaft 16, a pinion provided at the lower end of the steering shaft 16, and a rack 18 extending laterally and meshing with the pinion. The two ends of the rack 18 are connected to left and right knuckles 8 via tie rods, respectively. When the steering wheel 17 connected to the steering shaft 16 is turned, the rack 18 moves laterally in the corresponding direction, causing the front wheels 4A to be steered via the corresponding knuckles 8. Further, the steering shaft 16 is fitted with an electric motor that applies assist torque to the steering shaft 16 in response to a steering input from the driver.

Each of the front wheels 4A and the rear wheels 4B is provided with a brake device 20. The brake device 20 may consist of a disc brake device which is configured to generate a braking force on the corresponding wheel 4A, 4B by means of the oil pressure supplied from an oil pressure supply device 21. A brake system 22 is formed by the brake devices 20 of the different wheels and the oil pressure supply device 21. The brake system 22 is a braking force generating system that generates a braking force acting on the vehicle 1. The oil pressure supply device 21 is configured to independently control the hydraulic pressure supplied to each brake device 20 so that the braking forces applied to the front wheels 4A and the rear wheels 4B of the brake system 22 can be changed independently of each other.

The vehicle 1 is provided with a vehicle control system 30 that controls the behavior of the vehicle 1. The vehicle control system 30 includes a control device 31 as a main part thereof. The control device 31 is essentially an electronic control circuit (ECU) composed of a microcomputer, ROM, RAM, a peripheral circuit, an input/output interface, various drivers, and the like. The control device 31 is connected to the power plant 6, the oil pressure supply device 21, and various sensors so as to be able to exchange signals via a communication means such as CAN (Controller Area Network).

The vehicle body 2 is provided with an accelerator pedal sensor that detects the amount of operation of the accelerator pedal (accelerator opening Ap) and a brake pedal sensor that detects the amount of operation of the brake pedal (brake pedal stroke Bp). The control device 31 executes multiple control operations. In one of these control operations, a target braking force Fbt to be generated by the brake system 22 is calculated from the brake pedal stroke Bp or the like, and an oil pressure supply device 21 is controlled according to the target braking force Fbt. In another control operation, the control device 31 calculate a target driving force Fdt that is to be generated by the vehicle 1 from the accelerator opening Ap or the like, and controls the power plant 6 based on the target driving force Fdt.

When the power plant 6 includes an electric motor, the control device 31 may generate the braking force according to the brake pedal stroke Bp by using a regenerative brake obtained by operating the electric motor as a generator. Further, in this case, the control device 31 calculates a requested fore and aft force Fxr by adding the requested driving force Fdr determined by the accelerator opening Ap and the requested braking force Fbr determined the brake pedal stroke Bp, and controls at least one of the brake device 20 and the power plant 6. The requested driving force Fdr is a component that forms at least a part of the target driving force Fdt, and the requested braking force Fbr is a component that forms at least a part of the target braking force Fbt.

The vehicle 1 is equipped with an ACC (Adaptive Cruise Control System) as a form of an ADAS (Advanced Driver Assistance System). An ADAS switch 25 for turning on and off the ADAS is provided in the vicinity of the driver's seat. When the ADAS switch 25 is turned on by the driver's operation, the control device 31 starts controlling the vehicle speed V so as to maintain the vehicle speed V at a constant value selected by the vehicle operator or to maintain a selected vehicle-to-vehicle distance to the vehicle traveling in front of the own vehicle without requiring the vehicle operator to adjust the accelerator opening Ap or the brake pedal stroke Bp. For this purpose, the control device 31 sets a necessary control-requested braking force Fbc or a control-requested driving force Fdc, and performs an ADAS control for controlling the braking system 22 and the power plant 6 as required. Hereinafter, the control-requested driving force Fdc and the control-requested braking force Fbc are collectively referred to as a control-requested fore and aft force Fxc (Fxc=Fdc+Fbc). The control-requested fore and aft force may be generated by any other onboard device.

The control device 31 controls at least one of the brake system 22 and the power plant 6 to increase the lateral force of the front wheels 4A by shifting the load of the vehicle 1 to the side of the front wheels 4A at an early stage of a cornering operation without regard to the accelerator pedal operation or the brake pedal operation performed by the vehicle operator. More specifically, the control device 31 calculates an additional deceleration Gxadd to be added or applied to the vehicle 1 based on the vehicle state amounts representing the dynamic state of the vehicle 1 regardless of the driver's accelerator pedal operation and brake pedal operation, and controls at least one of the brake system 22 and the power plant 6 so as to generate an additional braking force Fbadd corresponding to the additional deceleration Gxadd. The vehicle state amounts include the vehicle speed V, which is the speed of the vehicle 1, the front wheel steering angle $\delta$, which is the steering angle of the front wheels 4A, and the front wheel steering angular velocity $\omega$, which is the steering angular velocity of the front wheels 4A.

The vehicle body 2 is provided with vehicle speed sensors 33, a front wheel steering angle sensor 34, and a front wheel steering angular velocity sensor 35 as vehicle state amount detection devices. Each of the front wheels 4A and the rear wheels 4B is provided with the corresponding vehicle speed sensor 33 which outputs a pulse signal generated in response to the rotation of the corresponding wheel 4A, 4B to the control device 31. The control device 31 acquires the wheel speeds of the front wheels 4A and the rear wheels 4B based on the signals from the vehicle speed sensors 33, and acquires the vehicle speed V by averaging the wheel speeds of the different wheels. The vehicle speed V is acquired as a positive value when moving forward and as a negative value when moving backward.

The front wheel steering angle sensor 34 outputs a signal corresponding to the rotational angle of the steering shaft 16 (steering wheel steering angle) to the control device 31. The control device 31 converts the rotational angle input from the front wheel steering angle sensor 34 into a rotational angle of the front wheels 4A (front wheel steering angle), which are the steered wheels, by multiplying the steering wheel steering angle by a predetermined gear ratio, and acquires the front wheel steering angle $\delta$. The front wheel steering angle $\delta$ is acquired as a positive value during a left turn operation and as a negative value during a right turn operation.

The front wheel steering angular velocity sensor 35 outputs a signal corresponding to the rotational angular velocity (steering wheel steering angular velocity) of the steering shaft 16 to the control device 31. The control device 31 converts the angular velocity input from the front wheel steering angular velocity sensor 35 into the steering angular velocity of the front wheels 4A (front wheel steering angular velocity), which are the steered wheels, by multiplying the angular velocity input from the front wheel steering angular velocity sensor 35 by a predetermined gear ratio, and acquires the front wheel steering angular velocity $\omega$. The front wheel steering angular velocity $\omega$ is acquired as a positive value during a leftward turning operation and as a negative value during a rightward turning operation. The front wheel steering angular velocity $\omega$ is a time differentiated value of the front wheel steering angle $\delta$ and is represented by d/dt $\delta$. Hereinafter, in mathematical formulas and drawings, d/dt may be represented by a dot placed above the variable. In this particular case, the front wheel steering angular velocity $\omega$ is obtained not a value calculated by time-differentiating the front wheel steering angle $\delta$, but as a speed detection value corresponding to the angular velocity output from the front wheel steering angular velocity sensor 35.

In another embodiment, the front wheel steering angle sensor 34 detects the stroke of the rack 18 in the lateral direction, and the control device 31 multiplies the stroke input from the front wheel steering angle sensor 34 by a predetermined coefficient to obtain the front wheel steering angle $\delta$. Further, it may be arranged such that the front wheel steering angular velocity sensor 35 detects the stroke speed of the rack 18 in the lateral direction, and the control device 31 multiplies the stroke speed input from the front wheel steering angle sensor 34 by a predetermined coefficient to obtain the steering angular velocity of the front wheels 4A. The front wheel steering angular velocity is thus detected as a value corresponding to the linear stroke velocity of the rack 18.

The control device 31 serves as a vehicle speed acquisition device that acquires the vehicle speed V in cooperation with the vehicle speed sensors 33, a front wheel steering angle acquisition device that acquires the front wheel steering angle $\delta$ in cooperation with the front wheel steering angle sensor 34, and a front wheel steering angular velocity acquisition device that acquires the front wheel steering angular velocity ω in cooperation with the front wheel steering angular velocity sensor 35.

Figure 2:
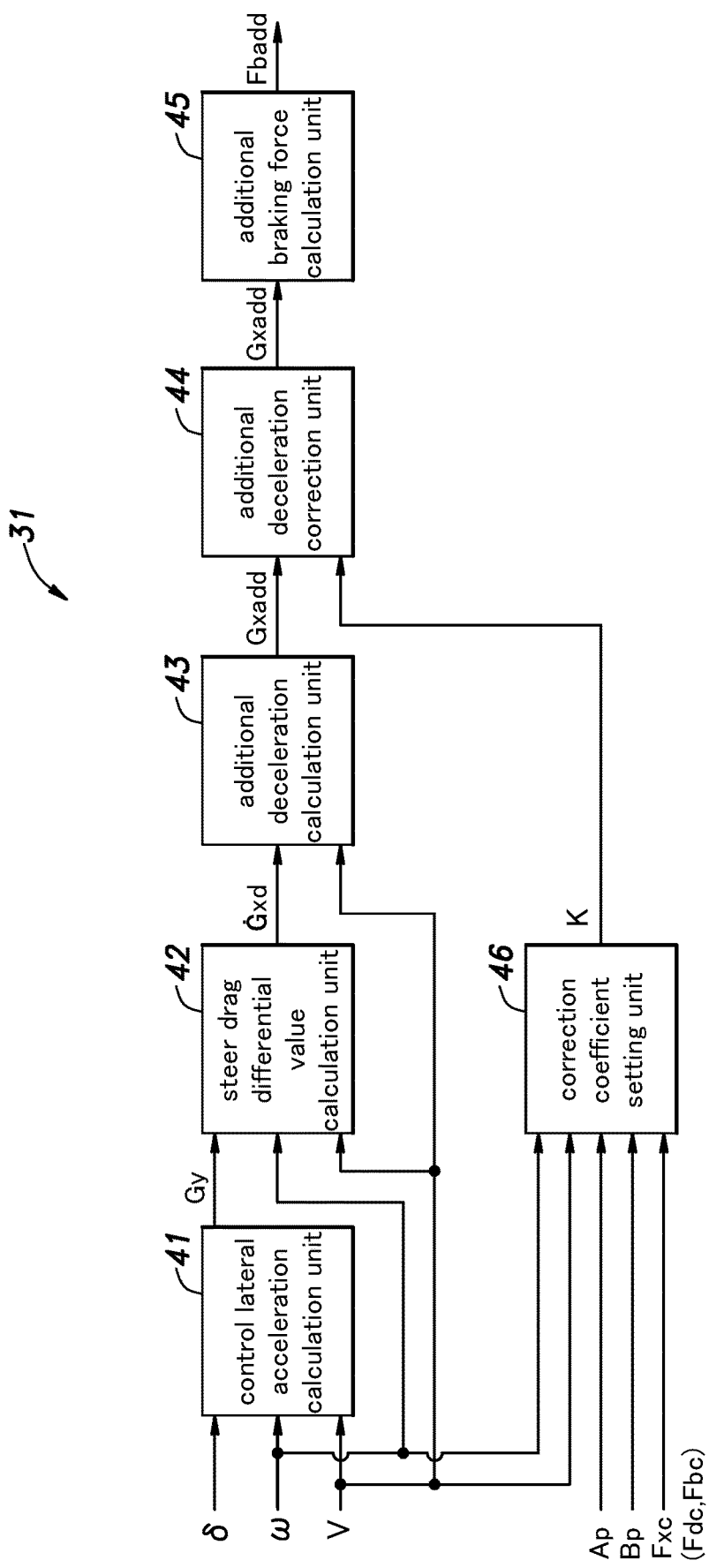
FIG. 2 is a functional block diagram of a control device included in the vehicle control system.

As shown in FIG. 2, the control device 31 includes a control lateral acceleration calculation unit 41, a steer drag differential value calculation unit 42, an additional deceleration calculation unit 43, an additional deceleration correction unit 44, an additional braking force calculation unit 45, and a correction coefficient setting unit 46. The control lateral acceleration calculation unit 41 calculates a control lateral acceleration Gy used for an additional deceleration control (which will be discussed hereinafter) based on the front wheel steering angle δ, the front wheel steering angular velocity ω, and the vehicle speed V. The steer drag differential value calculation unit 42 calculates a steer drag differential value d/dt GxD obtained by time differentiating a steer drag GxD, which is a component of the lateral force of the front wheels 4A directed rearward of the vehicle 1, obtained from the control lateral acceleration Gy, the front wheel steering angle δ, and the front wheel steering angular velocity ω. The additional deceleration calculation unit 43 calculates an additional deceleration Gxadd to be applied to the vehicle 1 according to the steer drag differential value d/dt GxD. The correction coefficient setting unit 46 calculates the requested fore and aft acceleration Gxr based on the requested fore and aft force Fxr applied to the vehicle 1, and sets the correction coefficient K for weakening the additional deceleration Gxadd based on the requested fore and aft acceleration Gxr. The additional deceleration correction unit 44 corrects the additional deceleration Gxadd by multiplying the correction coefficient K set by the correction coefficient setting unit 46 thereto. The additional braking force calculation unit 45 calculates the additional braking force Fbadd to be generated in the power plant 6 and/or the brake system 22 based on the corrected additional deceleration Gxadd.

By operating these functional units, the control device 31 executes an additional deceleration control to generate a braking force acting on the vehicle 1 from the power plant 6 and/or the brake system 22. The control device 31 causes the load of the vehicle 1 to be shifted to the side of the front wheels 4A by executing the additional deceleration control so as to generate the additional deceleration Gxadd so that the load of the vehicle 1 is shifted to the side of the front wheels 4A at an early stage of a cornering maneuver, and the cornering performance (heading performance) of the vehicle 1 can be improved.

In this way, the control device 31 calculates the additional braking force Fbadd based on the front wheel steering angle δ, the front wheel steering angular velocity ω and the vehicle speed V, and executes the additional deceleration control whereby the braking force to be applied to the vehicle 1 is generated by the power plant 6 and/or the brake system 22. This control process is executed by the control device 31 without using the actual lateral acceleration of the vehicle 1 detected by a lateral acceleration sensor. As a result, the control lateral acceleration Gy can be advanced in phase with respect to the actual lateral acceleration so that the additional deceleration Gxadd can be generated in the vehicle 1 earlier than when the actual lateral acceleration is used. Therefore, it is possible to reduce a time delay of the additional deceleration Gxadd that could be caused by the communication delay in acquiring the sensor information, the communication delay of the target braking force information, and the response delay of the braking force generating device.

Figure 3:
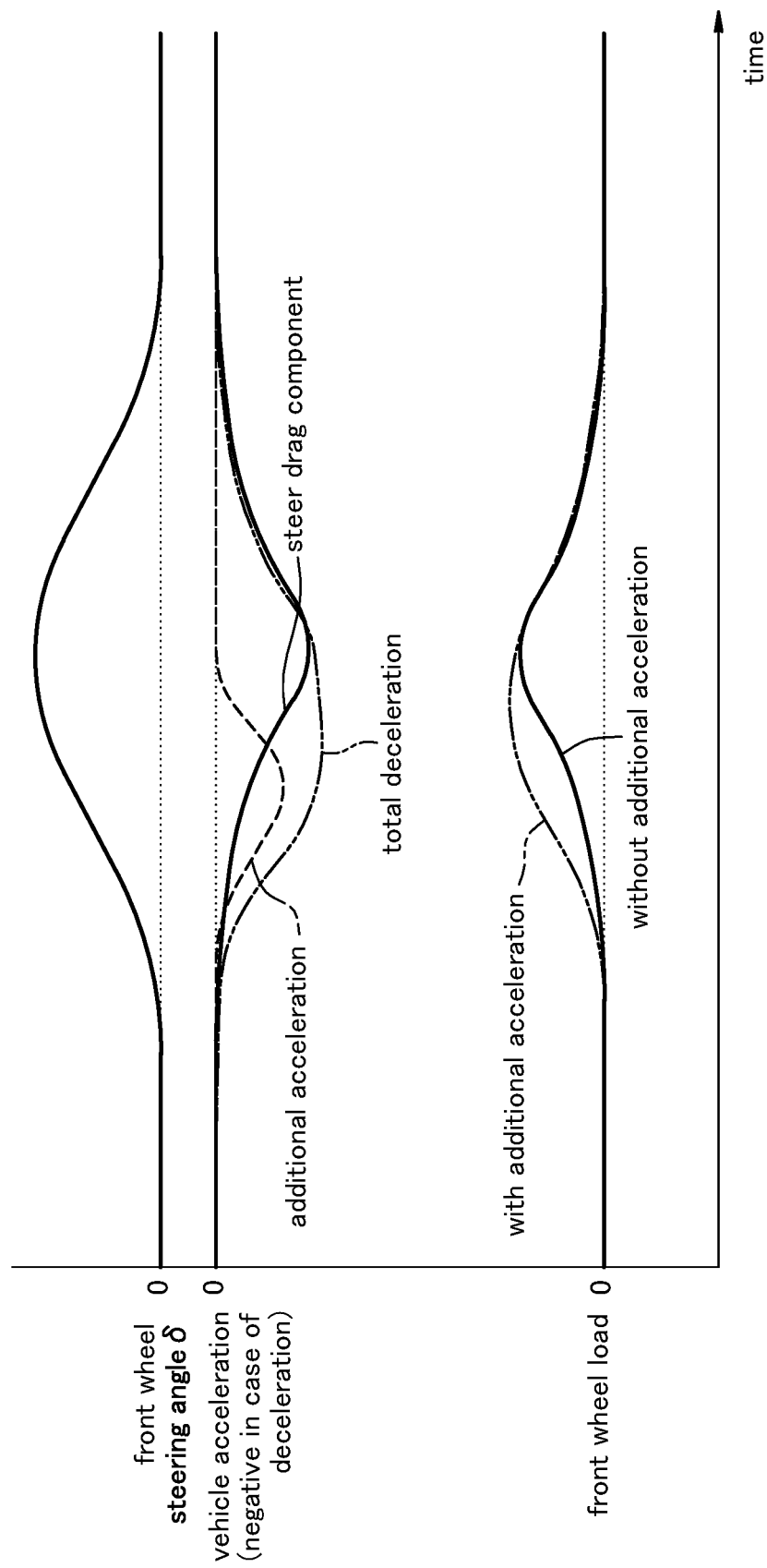
FIG. 3 is a time chart showing a mode of operation of the control device.

FIG. 3 is a time chart showing the working principle of the additional deceleration control executed by the control device 31. As shown in FIG. 3, when the steering wheel 17 is operated and the front wheel steering angle δ increases, a traveling resistance (steer drag GxD) is created in the front wheels 4A, and as shown by the solid lines, the vehicle 1 decelerates by an amount corresponding to the amount of the steer drag (due to this steer drag GxD). The deceleration of the vehicle 1 causes the front wheel load of the vehicle 1 to be increased in a corresponding amount. The deceleration of the vehicle 1 or the increase in the front wheel load corresponding to the steer drag occurs with some time delay relative to the increase of the front wheel steering angle δ. Thus, there is some response delay between the steering of the front wheels 4A and the resultant increase in the steer drag.

On the other hand, the steer drag differential value d/dt GxD is advanced in phase relative to the steer drag GxD by 90°. Therefore, when the additional deceleration calculation unit 43 calculates the additional deceleration Gxadd based on the steer drag differential value d/dt GxD, and the control device 31 generates the additional braking force Fbadd based on this calculated steer drag differential value d/dt GxD, the additional deceleration Gxadd is additionally applied to the vehicle 1 in such a manner that the total deceleration of the vehicle 1 is advanced in phase relative to the deceleration component due to the steer drag as shown by the imaginary line in FIG. 3. As a result, the front wheel load starts increasing with an advanced phase as compared with the case where no additional deceleration Gxadd is applied so that the cornering performance of the vehicle 1 is improved.

Figure 4:
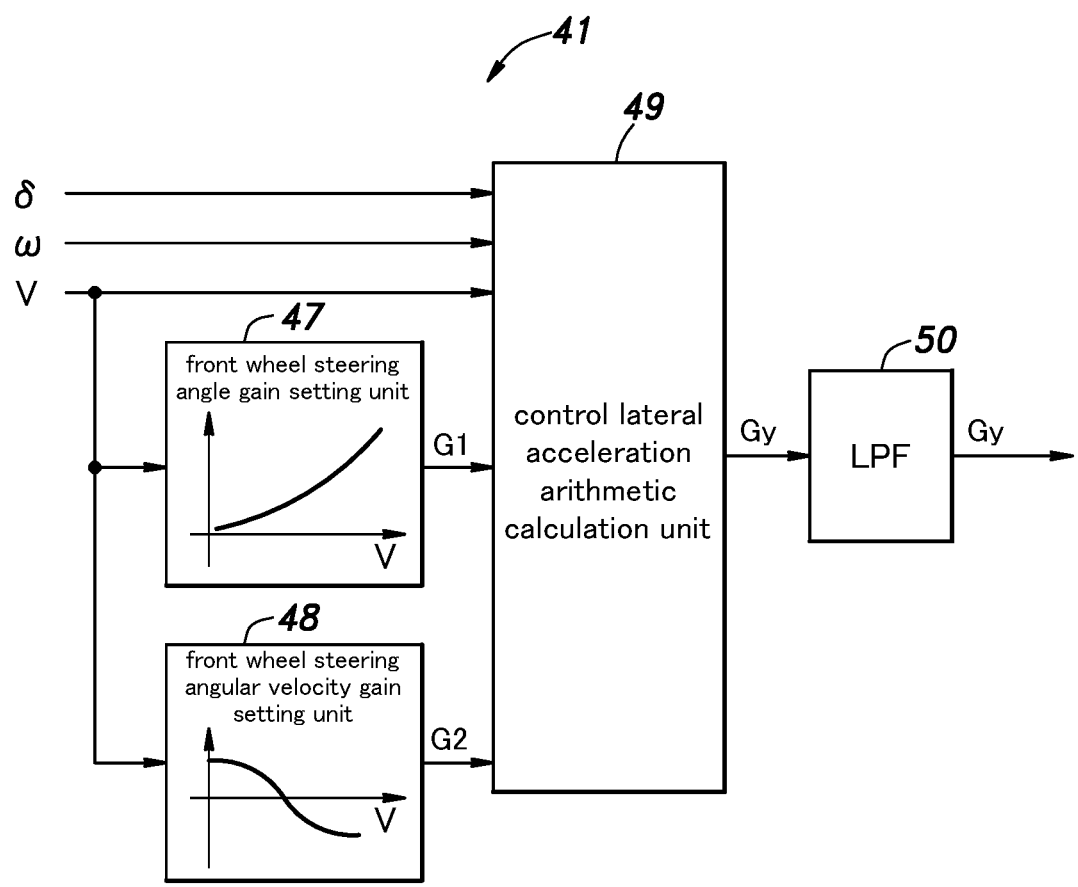
FIG. 4 is a functional block diagram of a control lateral acceleration calculation unit of the control device.

As shown in FIG. 4, the control lateral acceleration calculation unit 41 includes a front wheel steering angle gain setting unit 47, a front wheel steering angular velocity gain setting unit 48, a control lateral acceleration arithmetic calculation unit 49, and a low-pass filter (hereinafter referred to as LPF 50). The front wheel steering angle gain setting unit 47 sets a front wheel steering angle gain G1 which is a first correction value with respect to the front wheel steering angle δ used for calculating the control lateral acceleration Gy based on the vehicle speed V. The front wheel steering angular velocity gain setting unit 48 sets a front wheel steering angular velocity gain G2 which is a second correction value for the front wheel steering angular velocity ω used for calculating the control lateral acceleration Gy based on the vehicle speed V. The control lateral acceleration arithmetic calculation unit 49 calculates the control lateral acceleration Gy based on the front wheel steering angle δ, the front wheel steering angular velocity ω, the front wheel steering angle gain G1, and the front wheel steering angular velocity gain G2.

The front wheel steering angle gain setting unit 47 is provided with a front wheel steering angle gain map defining the relationship between the vehicle speed V and the front wheel steering angle gain G1 such that the desired characteristics of the responsiveness of the lateral acceleration to the front wheel steering angle δ, which changes according to the vehicle speed V, may be achieved. The front wheel steering angle gain setting unit 47 extracts a value corresponding to the vehicle speed V from the front wheel steering angle gain map, and sets the extracted value as the front wheel steering angle gain G1.

The front wheel steering angular velocity gain setting unit 48 is provided with a front wheel steering angular velocity gain map defining the relationship between the vehicle speed V and the front wheel steering angular velocity gain G2 such that the desired characteristics of the responsiveness of the lateral acceleration to the front wheel steering angular velocity ω, which changes according to the vehicle speed V, may be achieved. The front wheel steering angular velocity gain setting unit 48 extracts a value corresponding to the vehicle speed V from the front wheel steering angular velocity gain map, and sets the extracted value as the front wheel steering angular velocity gain G2.

The control lateral acceleration arithmetic calculation unit 49 calculates the control lateral acceleration Gy by calculating Equation (1) given below:

$$Gy = G1 \cdot \delta + G2 \cdot \omega \quad (1)$$

Thus, the control lateral acceleration arithmetic calculation unit 49 calculates the first multiplication value (the first term of Equation (1)) by multiplying the front wheel steering angle δ by the front wheel steering angle gain G1 which is the first correction value based on the vehicle speed V, calculates the second multiplication value (the second term of Equation (1)) by multiplying the front wheel steering angular velocity ω by the front wheel steering angular velocity gain G2, which is the second correction value based on the vehicle speed V, and calculates the control lateral acceleration Gy by adding the first multiplication value and the second multiplication value to each other. By calculating the control lateral acceleration Gy in this way by using the control lateral acceleration calculation unit 41, the contribution of the control lateral acceleration Gy to the lateral acceleration of the vehicle 1 is caused to change with the vehicle speed V in such a manner that the response of the actual lateral acceleration to the steering operation changes with the vehicle speed V in an optimum fashion.

When calculating the control lateral acceleration Gy, the control lateral acceleration arithmetic calculation unit 49 uses the front wheel steering angular velocity ω acquired from the front wheel steering angular velocity sensor 35, instead of the time differential value of the front wheel steering angle δ acquired from the front wheel steering angle sensor 34. Thereby, Equation (1) used for calculating the control lateral acceleration Gy is prevented from being one of a higher order. As a result, calculation delay in the control device 31 can be minimized so that the control lateral acceleration Gy can be calculated in a more appropriate manner. Further, when the control device 31 holds the previous value (the value obtained in the previous control cycle) because of a failure to obtain the current steering angle information from the sensor, the steering angular velocity value is prevented from changing in an oscillatory manner. This topic will be discussed in a greater detail hereinafter.

The LPF 50 performs a low-pass filter process on the control lateral acceleration Gy calculated by the control lateral acceleration arithmetic calculation unit 49. As a result, the increase in the high frequency gain is suppressed so that undue fluctuations of the control lateral acceleration Gy in a high frequency region is prevented, and the noise in the control lateral acceleration Gy is substantially eliminated. By performing the low-pass filter process on the control lateral acceleration Gy by using the control lateral acceleration calculation unit 41 in this way, it becomes possible to apply a stable braking force to the vehicle 1.

Equation (1) is an approximation of the equation for the control lateral acceleration Gy of the conventional model calculated by using the planar two degrees of freedom model of the vehicle 1 by disregarding the second order delay component and the differential component determined by the specifications of the vehicle 1. The control lateral acceleration arithmetic calculation unit 49 calculates the control lateral acceleration Gy by using Equation (1) based on the front wheel steering angle δ, the front wheel steering angular velocity ω, and the vehicle speed V in this way. Therefore, the phase of the control lateral acceleration Gy can be advanced as compared with the conventional technique of calculating the control lateral acceleration Gy by using a planar two degrees of freedom model, and the additional deceleration Gxadd can be generated in the vehicle 1 at an early stage.

Figure 5:
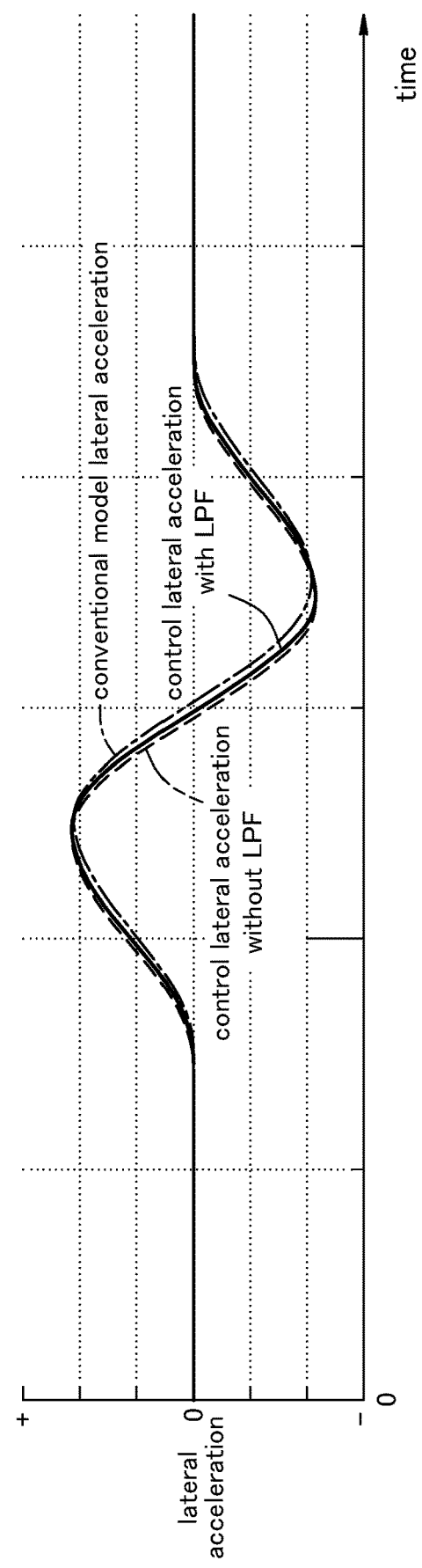
FIG. 5 is a time chart showing changes in various lateral accelerations with time at a certain vehicle speed.

FIG. 5 is a time chart of various lateral accelerations calculated at a certain vehicle speed. The various lateral accelerations (the three lateral accelerations) include the conventional model lateral acceleration Gyc calculated by using the planar two degrees of freedom model, the control lateral acceleration Gy calculated by using the control lateral acceleration arithmetic calculation unit 49, and the control lateral acceleration Gy which is additionally subjected to the filtering process by the LPF50.

As shown in FIG. 5, when the steering wheel 17 is steered to the left and then to the right, the conventional model lateral acceleration Gyc becomes a positive value and then a negative value. The control lateral acceleration Gy calculated by the control lateral acceleration arithmetic calculation unit 49 is advanced in phase relative to the conventional model lateral acceleration Gyc. The control lateral acceleration Gy which is additionally subjected to the filtering process by the LPF 50 is somewhat delayed in phase as compared with the control lateral acceleration Gy without filtering, but is well ahead of the conventional model lateral acceleration Gyc in phase.

Figure 6:
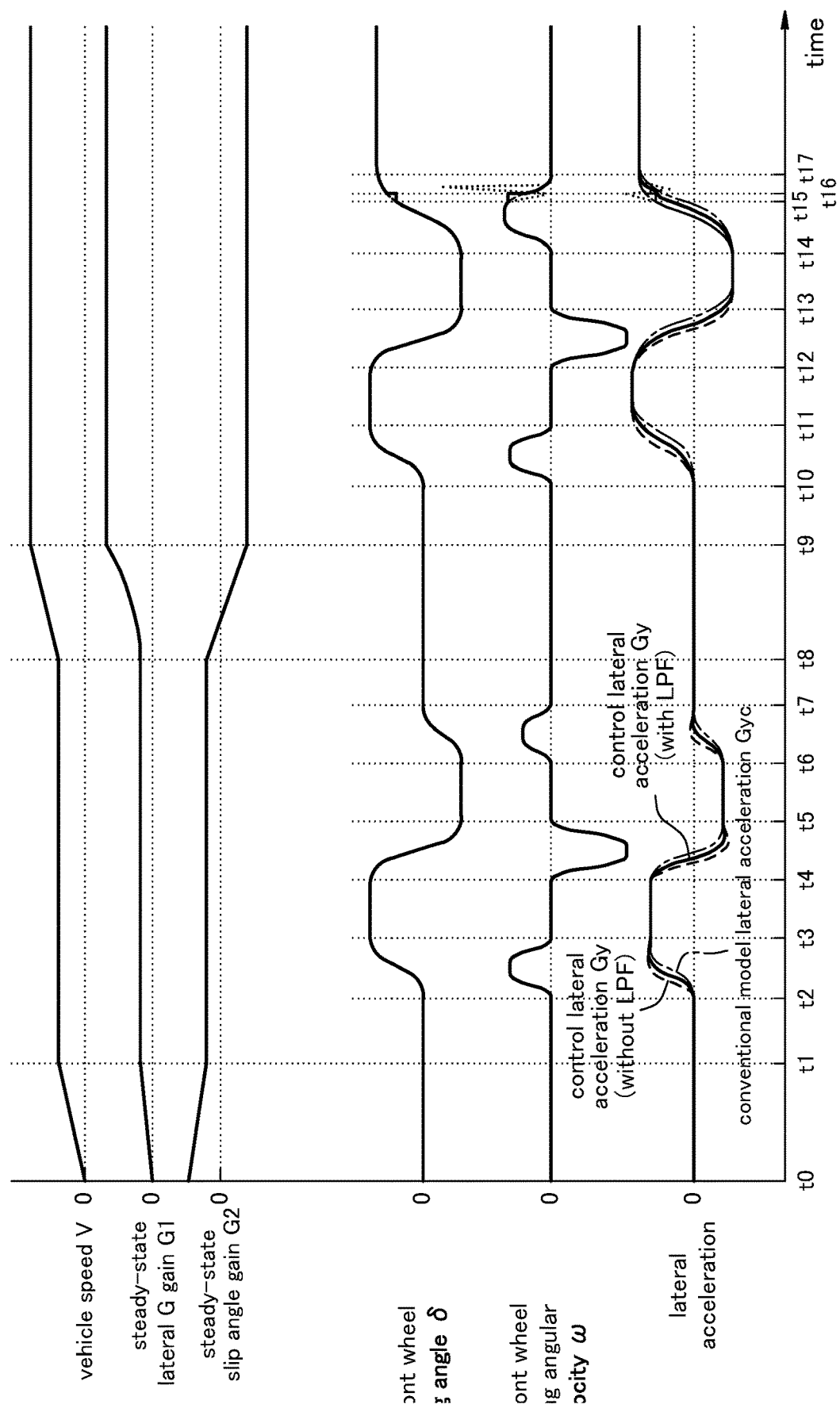
FIG. 6 is a time chart showing changes in various variables associated with the control lateral acceleration.

FIG. 6 is a time chart showing a calculation example of the control lateral acceleration Gy. As shown in FIG. 6, the value of the front wheel steering angle gain G1 and the value of the front wheel steering angular velocity gain G2 both change during the intervals between the time point t0 and the time point t1, and between the time point t8 and the time point t9 due to the changes in the vehicle speed V. More specifically, the front wheel steering angle gain G1 increases as the vehicle speed V increases. The front wheel steering angular velocity gain G2 decreases as the vehicle speed V increases, and may even become a negative value when the vehicle speed V is equal to or higher than a predetermined value.

The front wheel steering angle δ increases from 0 during the time interval between the time point t2 and the time point t3, decreases to a negative value during the time interval between the time point t4 and the time point t5, and increases again back to value 0 during the time interval between the time point t6 and the time point t7. The front wheel steering angular velocity ω becomes positive during the time intervals between the time point t2 and the time point t3, and between the time point t6 and the time point t7, and becomes negative during the time interval between the time point t4 and the time point t5. During the time periods between the time point t2 and the time point t3, between the time point t4 and the time point t5, and between the time point t6 to time point t7, the control lateral acceleration Gy before filtering (without filtering), the control lateral acceleration Gy after filtering (with filtering), and the conventional model lateral acceleration Gyc start changing in this order.

A similar behavior can be observed during the time interval between the time point t10 and the time point t17 as that observed during the time interval between the time point t2 and the time point t7. However, the steering angle information (the front wheel steering angle δ acquired by the front wheel steering angle sensor 34 and the front wheel steering angular velocity ω acquired by the front wheel steering angular velocity sensor 35) failed to be inputted from the sensors to the control device 31 at the time point t16, and is inputted only at the time point t17. In this manner, when the steering angle information is temporarily lost (failure to update the information occurs), the control device 31 retains the immediately preceding steering angle information (at the time point t15) (the steering angle information of the previous control cycle), and the steering angle information is used thereafter (at the time point t16) (in the current control cycle). Therefore, in appearance, the steering angle information does not change from the time point t15 to the time point t16, and changes somewhat more significantly than the actual change that may have taken place from the time point t16 to the time point t17.

As described above, the control lateral acceleration arithmetic calculation unit 49 uses the front wheel steering angle δ acquired from the front wheel steering angle sensor 34 and the front wheel steering angular velocity ω acquired from the front wheel steering angular velocity sensor 35 to calculate the control lateral acceleration Gy. Therefore, the control lateral acceleration Gy also does not change from the time point t15 to the time point t16, and changes slightly more significantly than the actual change from the time point t16 to the time point t17.

In the example for comparison shown in FIG. 6, the front wheel steering angular velocity ω obtained by time differentiating the front wheel steering angle δ, and the control lateral acceleration Gy obtained from this front wheel steering angular velocity ω and the front wheel steering angle δ are indicated by dotted lines (during the time intervals between the time point t15 and the time point t16). In this case, from the time point t15 to the time point t16, the control device 31 holds the value of the front wheel steering angle δ, and since the front wheel steering angle δ does not change, the front wheel steering angular velocity ω becomes 0. From the time point t16 to the time point t17, the front wheel steering angle δ changes significantly from the held value so that the front wheel steering angular velocity ω sharply increases, and then returns to the actual value. In this way, the front wheel steering angular velocity ω calculated by the time differentiation changes sharply in an oscillatory manner, and the control lateral acceleration Gy calculated by using this sharply changing front wheel steering angular velocity ω also changes sharply.

In the present embodiment, since the control lateral acceleration calculation unit 41 uses the front wheel steering angular velocity ω acquired from the front wheel steering angular velocity sensor 35, instead of the time differentiated value of the front wheel steering angle δ, to calculate the control lateral acceleration Gy, the formula in Equation (1) for calculating the control lateral acceleration may consist of a relatively low order formula. As a result, the change in the front wheel steering angular velocity ω is suppressed, and any discontinuity (sudden change) of the control lateral acceleration Gy due to the information discontinuity is alleviated.

Figure 7:
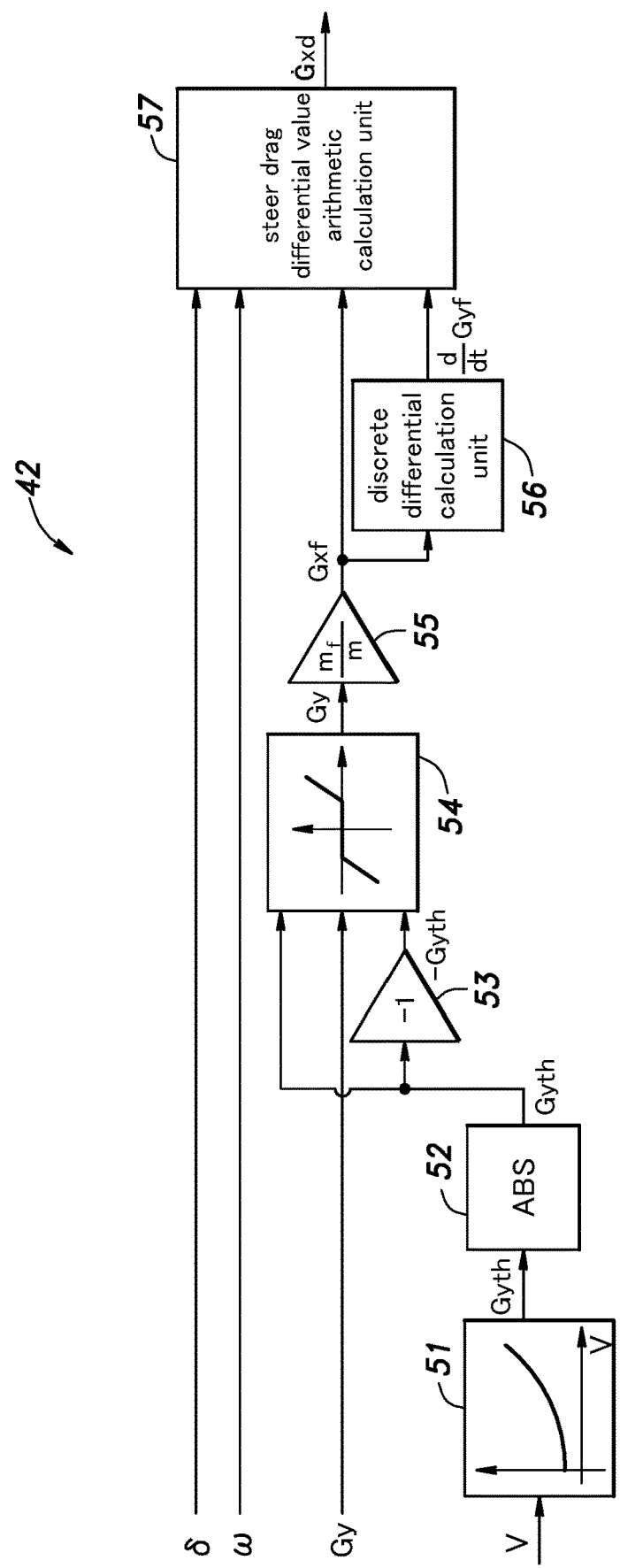
FIG. 7 is a functional block diagram of an additional deceleration calculation unit.

FIG. 7 is a functional block diagram of the steer drag differential value calculation unit 42. As shown in FIG. 7, the steer drag differential value calculation unit 42 includes a dead zone threshold value setting unit 51, an absolute value calculation unit 52, a negative value calculation unit 53, a dead zone processing unit 54, a control lateral acceleration front wheel component calculation unit 55, a discrete differential calculation unit 56, and a steer drag differential value arithmetic calculation unit 57.

The dead zone threshold value setting unit 51 sets a threshold Gyth to be used for the dead zone process for the control lateral acceleration Gy according to the vehicle speed V. More specifically, the dead zone threshold value setting unit 51 sets the threshold value Gyth to a positive value which gets larger with a higher vehicle speed V. The absolute value calculation unit 52 calculates the absolute value of the threshold value Gyth set by the dead zone threshold value setting unit 51. Since the dead zone threshold value setting unit 51 sets a positive value to the threshold value Gyth, the absolute value calculation unit 52 outputs the threshold value Gyth as it is. The negative value calculation unit 53 multiplies the threshold value Gyth by −1 to convert the threshold value Gyth to a negative value, and outputs the converted negative value threshold value−Gyth.

The dead zone processing unit 54 performs a dead zone process on the control lateral acceleration Gy by using the positive threshold value Gyth and the negative value threshold value−Gyth. More specifically, when the absolute value of the inputted control lateral acceleration Gy is equal to or less than the threshold value Gyth (|Gy|≤Gyth), the dead zone processing unit 54 outputs 0 as the control lateral acceleration Gy as the dead zone process, and when the absolute value of the inputted control lateral acceleration Gy is larger than the threshold value Gyth Gy Gyth), the absolute value of the control lateral acceleration Gy is reduced by the threshold value Gyth, and this reduced value is outputted as the control lateral acceleration Gy as the dead zone processing.

By performing the dead zone process in this way, the dead zone processing unit 54 outputs 0 as the control lateral acceleration Gy in the dead zone region where the absolute value is equal to or less than the predetermined threshold value Gyth. Therefore, in the dead zone region, no additional deceleration Gxadd is generated so that the vehicle behavior is the same as that of the base vehicle on which the vehicle control system 30 is mounted. Therefore, in the range of the front wheel steering angle δ where the vehicle travels substantially straight ahead (the dead zone region), the steering reaction force is the same as that of the base vehicle, and the vehicle 1 maintains the same responsiveness as the base vehicle. In this operating condition, since the frequency of occurrence of the additional braking force Fbadd decreases, the decrease in the durability of the brake system 22 and the brake lamp is not adversely affected. Further, in the operating range corresponding to this control dead zone, since the additional braking force Fbadd does not act on the vehicle 1 in the range where the front wheel steering angle δ is small, the operation of the vehicle control system 30 is prevented from interfering with the operation of other functional devices that are configured to operate when the vehicle travels straight ahead. On the other hand, when the control lateral acceleration Gy starts exceeding the predetermined threshold value Gyth, the control lateral acceleration is outputted as a continuous value increasing from 0 following the dead zone process. Therefore, the additional deceleration Gxadd increases gradually so that the cornering performance of the vehicle 1 can be improved while maintaining a smooth vehicle behavior.

The control lateral acceleration front wheel component calculation unit 55 multiplies the control lateral acceleration Gy which has been subjected to the dead zone processing by a front axle mass ratio mf/m (which is the ratio of the front axle mass mf to the vehicle mass m) to calculate a control lateral acceleration front wheel component Gyf which is the front wheel component of the control lateral acceleration Gy. The discrete differential calculation unit 56 differentiates the control lateral acceleration front wheel component Gyf to calculate the control lateral acceleration front wheel component differential value d/dt Gyf. The steer drag differential value arithmetic calculation unit 57 calculates the steer drag differential value d/dt GxD (=d/dt (Gyf·δ)), which is the differential value of the steer drag GxD (=Gyf·δ), from the front wheel steering angle δ, the front wheel steering angular velocity ω, the control lateral acceleration front wheel component Gyf and the control lateral acceleration front wheel component differential value d/dt Gyf by using Equation (2) given in the following.

$$\frac{d}{dt}(G_{yf} \cdot \delta) = \frac{d}{dt}(G_{yf}) \cdot \delta + G_{yf} \cdot \dot{\delta} \quad (2)$$

Figure 8:
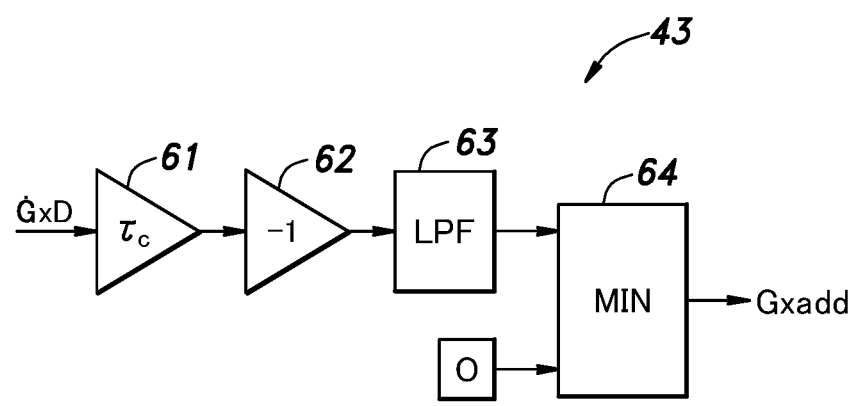
FIG. 8 is a functional block diagram of a correction coefficient calculation unit.

FIG. 8 is a functional block diagram of the additional deceleration calculation unit 43. As shown in FIG. 8, the additional deceleration calculation unit 43 includes an advance time constant multiplication unit 61, a negative value calculation unit 62, an LPF 63 (low-pass filter), and a low value selection unit 64.

The advance time constant multiplication unit 61 multiplies the steer drag differential value d/dt GxD by the advance time constant τC. As a result, the magnitude of the steer drag differential value d/dt GxD, which is the basis for calculating the additional deceleration Gxadd shown in FIG. 3, is changed so that the degree of phase advance with respect to the deceleration of the steer drag of the total deceleration is adjusted. The negative value calculation unit 62 converts the product of the steer drag differential value d/dt GxD and the advance time constant τC into a negative value by multiplying −1 to the product so that the fore and aft acceleration generated in the vehicle 1 becomes a negative value (deceleration). The LPF 63 performs a low-pass filter process on the value converted into a negative value by the negative value calculation unit 62. As a result, the increase in the high frequency gain is suppressed so that the fluctuations of the additional deceleration Gxadd in the high frequency region is suppressed, and noise is removed. The low value selection unit 64 compares the value output from the LPF 63 with 0, selects a lower value to be outputted as the additional deceleration Gxadd. The additional deceleration Gxadd outputted from the low value selection unit 64 is a value equal to or smaller than 0.

As shown in FIG. 2, the additional deceleration Gxadd that is outputted from the additional deceleration calculation unit 43 is subjected to a correction process by the additional deceleration correction unit 44 so as to be weakened by being multiplied by a correction coefficient K which will be discussed hereinafter. The corrected additional deceleration Gxadd that is outputted from the additional deceleration correction unit 44 is used by the additional braking force calculation unit 45 to calculate the additional braking force Fbadd. The additional braking force calculation unit 45 outputs the calculated additional braking force Fbadd when the control permission flag F is 1, and does not output the calculated additional braking force Fbadd when the control permission flag F is 0. The control device 31 adds the additional braking force Fbadd outputted from the additional braking force calculation unit 45 to the target braking force Fbt or the requested fore and aft force Fxr, and causes the power plant 6 and/or the brake system 22 to generate the combined target braking force Fbt or the requested fore and aft force Fxr to which the additional braking force Fbadd is added. As a result, as shown in FIG. 3, a deceleration given as a combination of the additional deceleration Gxadd and the deceleration due to the steer drag is generated in the vehicle 1 so that the cornering performance of the vehicle 1 is improved.

Figure 9:
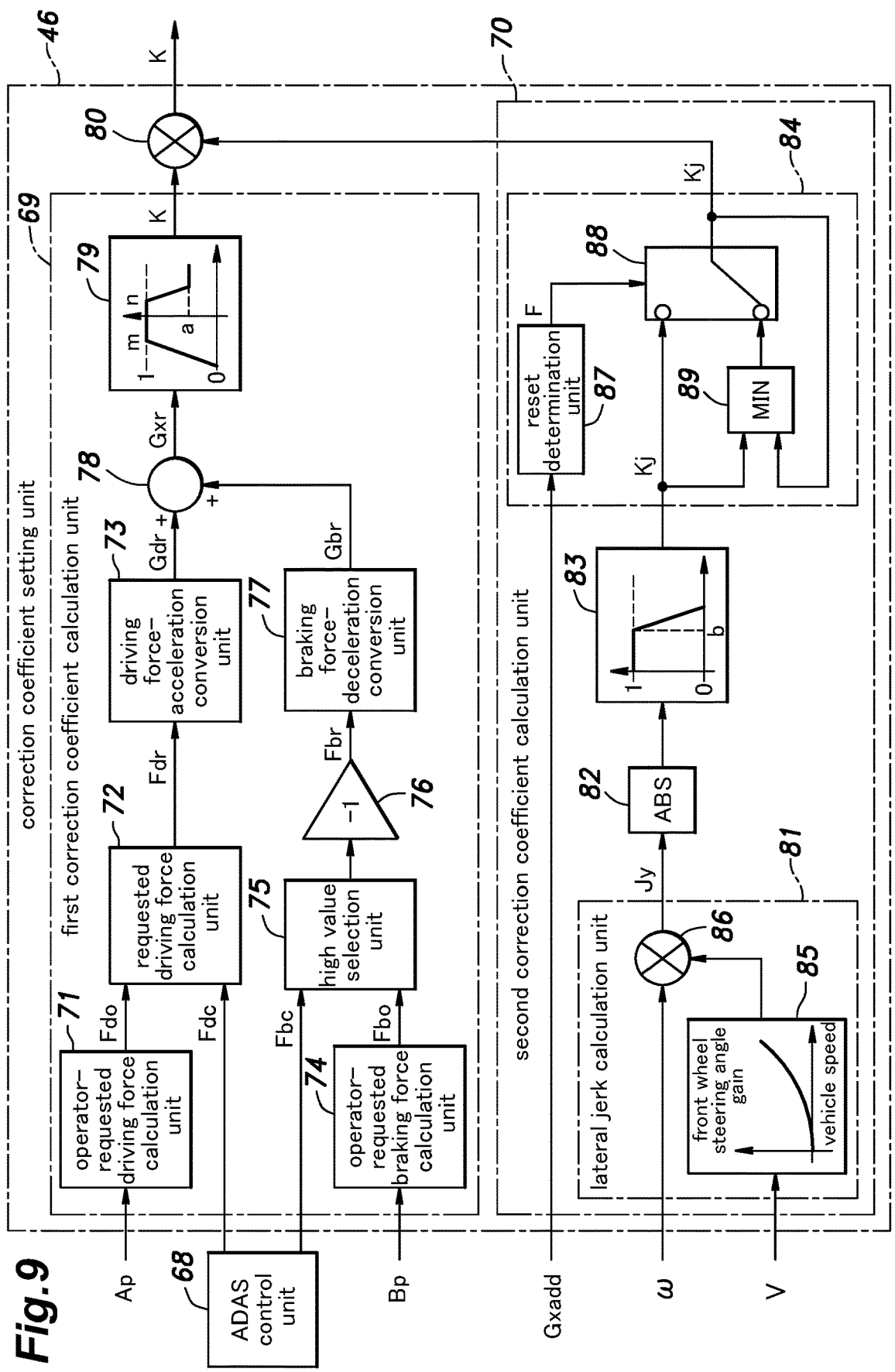
FIG. 9 is a functional block diagram of a correction coefficient setting unit.

FIG. 9 is a functional block diagram of the correction coefficient setting unit 46. As shown in FIG. 9, the control-requested fore and aft force Fxx (control-requested braking force Fbc and control-requested driving force Fdc) set by the ADAS control unit 68 that executes ADAS control is inputted to the correction coefficient setting unit 46. Further, the accelerator opening Ap, the brake pedal stroke Bp, the additional deceleration Gxadd calculated by the additional deceleration calculation unit 43 (FIG. 2), the front wheel steering angular velocity ω, and the vehicle speed V are inputted to the correction coefficient setting unit 46.

The correction coefficient setting unit 46 includes a first correction coefficient calculation unit 69 and a second correction coefficient calculation unit 70. The first correction coefficient calculation unit 69 includes an operator-requested driving force calculation unit 71, a requested driving force calculation unit 72, a driving force-acceleration conversion unit 73, an operator-requested braking force calculation unit 74, a high value selection unit 75, a negative value calculation unit 76, a braking force-deceleration conversion unit 77, an adder 78, and a first correction coefficient setting unit 79.

The operator-requested driving force calculation unit 71 calculates the operator-requested driving force Fdo to be applied to the vehicle 1 according to the operation of the driver as indicated by the accelerator opening Ap. The operator-requested driving force Fdo is calculated as a positive value that gets larger as the accelerator opening Ap is increased. The requested driving force calculation unit 72 calculates the requested driving force Fdr which the vehicle 1 is requested to generate based on the operator-requested driving force Fdo and the control-requested driving force Fdc. In the present embodiment, the requested driving force calculation unit 72 calculates the requested driving force Fdr by adding the control-requested driving force Fdc to the operator-requested driving force Fdo. In another embodiment, the requested driving force calculation unit 72 calculates or selects the larger of the operator-requested driving force Fdo and the control-requested driving force Fdc as the requested driving force Fdr. The driving force-acceleration conversion unit 73 calculates the requested acceleration Gdr for the vehicle 1 by dividing the requested driving force Fdr by the mass m of the vehicle 1.

The operator-requested braking force calculation unit 74 calculates the operator-requested braking force Fbo to be applied to the vehicle 1 according to the driver's operation as indicated by the brake pedal stroke Bp. The operator-requested braking force Fbo is calculated as a positive value that gets larger as the brake pedal stroke Bp is increased. Hereinafter, the operator-requested driving force Fdo and the operator-requested braking force Fbo are collectively referred to as an operator-requested fore and aft force Fxo (Fxo=Fdo+Fbo). The control-requested braking force Fbc inputted from the ADAS control unit 68 is also calculated as a value of 0 or larger. The high value selection unit 75 compares the operator-requested braking force Fbo with the control-requested braking force Fbc, and selects the greater of the two. The negative value calculation unit 76 outputs a value obtained by multiplying the value selected by the high value selection unit 75 by −1 as the requested braking force Fbr. The high value selection unit 75 and the negative value calculation unit 76 function as a requested braking force calculation unit that calculates the requested braking force Fbr from the operator-requested braking force Fbo and the control-requested braking force Fbc. The braking force-deceleration conversion unit 77 calculates the requested deceleration Gbr for the vehicle 1 by dividing the requested braking force Fbr by the mass m of the vehicle 1.

The adder 78 calculates the requested fore and aft acceleration Gxr by adding the requested acceleration Gdr and the requested deceleration Gbr to each other. In other words, the requested fore and aft acceleration Gxr is calculated from the requested driving force Fdr and the requested braking force Fbr for the vehicle 1 outputted from the requested driving force calculation unit 72 and the requested braking force calculation unit (75, 76). The requested fore and aft force Fxr can be obtained by adding the requested driving force Fdr and the requested braking force Fbr to each other as discussed earlier (Fdr+Fbr=Fxr). Therefore, the requested fore and aft force Fxr includes the requested driving force Fdr and the requested braking force Fbr.

Further, as discussed above, the requested driving force Fdr is calculated from the operator-requested driving force Fdo and the control-requested driving force Fdc, and the requested braking force Fbr is calculated from the operator-requested braking force Fbo and the control-requested braking force Fbc. In other words, the requested fore and aft force Fxr includes the operator-requested driving force Fdo, the control-requested driving force Fdc, the operator-requested braking force Fbo, and the control-requested braking force Fbc. Therefore, the requested fore and aft force Fxr includes the operator-requested fore and aft force Fxo by the driver's operation and the control-requested fore and aft force Fxc not by the driver's operation.

The first correction coefficient setting unit 79 sets the correction coefficient K based on the requested fore and aft acceleration Gxr. More specifically, the first correction coefficient setting unit 79 includes a correction coefficient map, and sets the correction coefficient K according to the requested fore and aft acceleration Gxr by looking up the correction coefficient map. The correction coefficient map is constructed such that: when the requested fore and aft acceleration Gxr is equal to or greater than a first value m (negative value) and is equal to or smaller than a second value n (positive value), the correction coefficient K is 1; when the requested fore and aft acceleration Gxr is smaller than the first value m, the correction coefficient K is a value which is greater than 0 and gets smaller as the requested fore and aft acceleration Gxr decreases; and when the requested fore and aft acceleration Gxr is greater than the second value n, the correction coefficient K is a value which is greater than 0 and smaller than 1, and gets smaller as the requested fore and aft acceleration Gxr increases. The correction coefficient K set by the first correction coefficient setting unit 79 is forwarded to the multiplier 80.

The second correction coefficient calculation unit 70 includes a lateral jerk calculation unit 81, an absolute value calculation unit 82, a second correction coefficient setting unit 83, and a switching processing unit 84. The lateral jerk calculation unit 81 includes a front wheel steering angle gain setting unit 85 having the same configuration as the front wheel steering angle gain setting unit 47 described above. In a multiplication unit 86 of the lateral jerk calculation unit 81, the front wheel steering angle gain G1 set by the front wheel steering angle gain setting unit 85 according to the vehicle speed V is multiplied by the front wheel steering angular velocity ω to calculate the lateral jerk Jy (=d/dt Gy). The lateral jerk Jy is an estimated lateral jerk value obtained by converting the front wheel steering angular velocity ω into a vehicle behavior equivalent value by multiplying the front wheel steering angular velocity ω by the front wheel steering angle gain G1. The control device 31 forms a lateral jerk acquisition device that acquires the lateral jerk Jy in cooperation with the vehicle speed sensor 33 and the front wheel steering angular velocity sensor 35.

The absolute value calculation unit 82 calculates the absolute value of the lateral jerk Jy calculated by the lateral jerk calculation unit 81. The second correction coefficient setting unit 83 sets the lateral jerk correction coefficient Kj according to the absolute value of the lateral jerk Jy. More specifically, the second correction coefficient setting unit 83 includes a lateral jerk correction coefficient map, and the lateral jerk correction coefficient Kj can be looked up from this lateral jerk correction coefficient map for each given absolute value of the lateral jerk Jy. In the lateral jerk correction coefficient map, the lateral jerk correction coefficient Kj is 1 when the absolute value of the lateral jerk Jy is equal to or smaller than a predetermined value b, and is a value which is equal to or greater than 0 and gets smaller as the absolute value of the lateral jerk Jy increases when the absolute value of the lateral jerk Jy is greater than the predetermined value b.

Instead of including the lateral jerk calculation unit 81, the absolute value calculation unit 82, and the second correction coefficient setting unit 83, the second correction coefficient calculation unit 70 may consist of a three-dimensional map which generates the lateral jerk correction coefficient Kj for a given input of the vehicle speed V and the front wheel steering angular velocity ω. However, in this case, as the number of grid points on this three-dimensional map increases, the labor required for creating the map may become prohibitively great. On the other hand, in the present embodiment, the second correction coefficient calculation unit 70 calculates the lateral jerk Jy normalized by the front wheel steering angular velocity ω, and uses a two-dimensional map to obtain the lateral jerk correction coefficient Kj from the lateral jerk Jy so that the labor required for creating the map can be minimized.

The switching processing unit 84 includes a reset determination unit 87, a switching unit 88, and a low value selection unit 89. The reset determination unit 87 determines if the additional deceleration Gxadd is 0, and if the additional deceleration Gxadd is 0, sets the reset flag F to 1. The switching unit 88 switches between the lateral jerk correction coefficient Kj set by the second correction coefficient setting unit 83 and the lateral jerk correction coefficient Kj set by the low value selection unit 89 according to the reset flag F. More specifically, when the reset flag F is 1, the lateral jerk correction coefficient Kj set by the second correction coefficient setting unit 83 is outputted and when the reset flag F is 0, the lateral jerk correction coefficient Kj selected by the low value selection unit 89 is outputted. The low value selection unit 89 compares the lateral jerk correction coefficient Kj set by the second correction coefficient setting unit 83 with the previous value of the lateral jerk correction coefficient Kj outputted from the switching unit 88, and selects the smaller of these two values.

Owing to this process performed by the switching processing unit 84, as a series of values of the additional deceleration Gxadd are outputted as shown in FIG. 3, the lateral jerk correction coefficient Kj changes only in the decreasing direction, and never increases in value.

As shown in FIG. 9, the lateral jerk correction coefficient Kj outputted from the switching processing unit 84 is inputted to a multiplier 80. The multiplier 80 corrects the correction coefficient K by multiplying the correction coefficient K by the lateral jerk correction coefficient Kj. As shown in FIG. 2, the lateral jerk correction coefficient Kj corrected by the lateral jerk correction coefficient Kj is inputted to the additional deceleration correction unit 44 to be multiplied to the additional deceleration Gxadd to correct the same.

Figure 10:
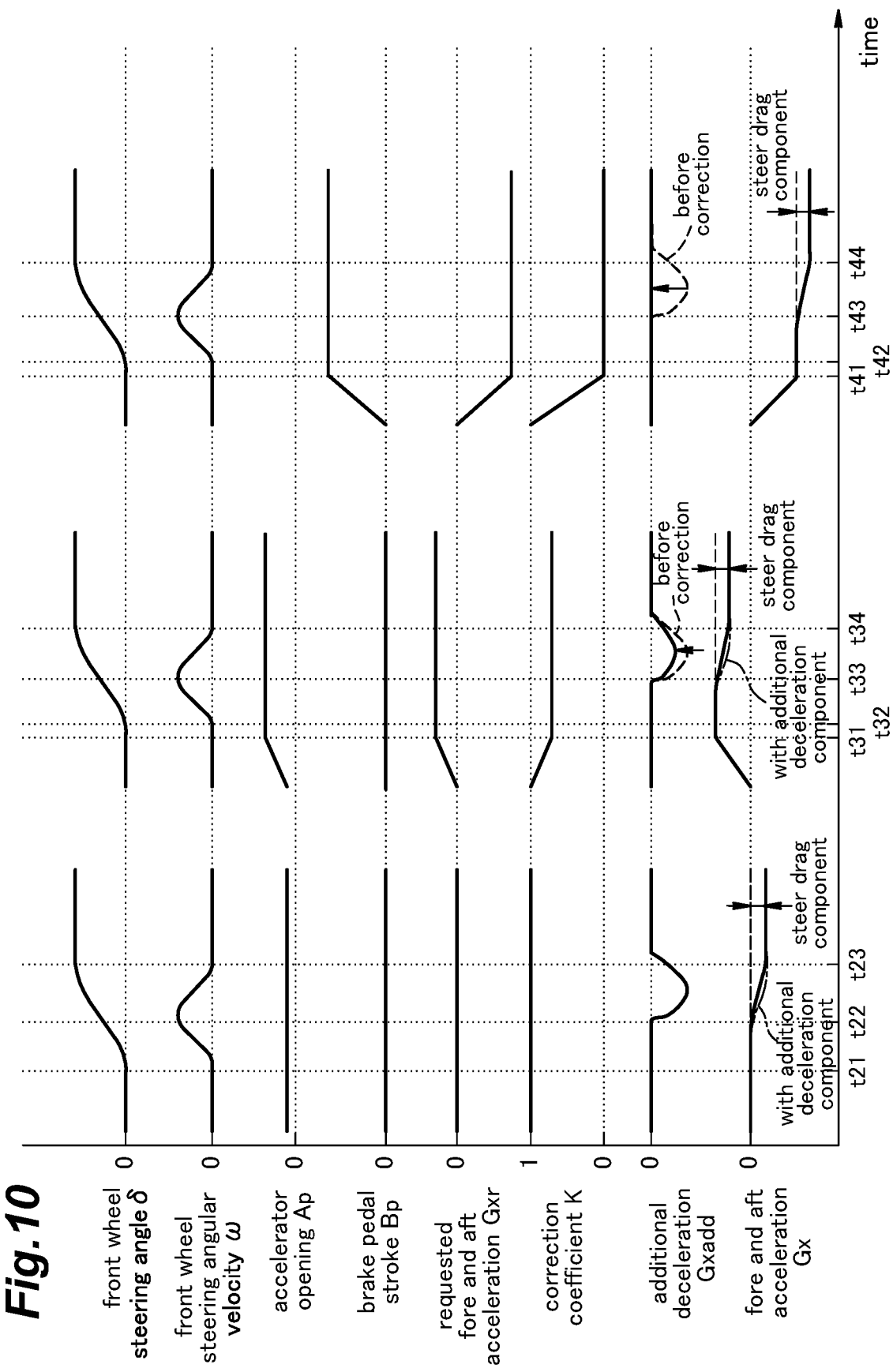
FIG. 10 is a time chart showing the changes in the additional deceleration along with various variables associated therewith in an embodiment of the present invention.

FIG. 10 is a time chart showing a calculation example of the additional deceleration Gxadd. In this example, the correction coefficient setting unit 46 of FIG. 9 employs only the first correction coefficient calculation unit 69 to set the correction coefficient K. As shown in FIG. 10, from the time point t1 to the time point t3, the steering wheel 17 is operated while the accelerator opening Ap is held at a small value necessary to maintain the vehicle speed V at a constant value. From the time point t11 to the time point t14, the steering wheel 17 is operated while the accelerator opening Ap is sufficiently large to accelerate the vehicle 1. From the time point t21 to the time point t24, the steering wheel 17 is operated while the brake pedal stroke Bp is large so as to decelerate the vehicle 1.

In the state where the accelerator opening Ap is held at a small value between the time point t21 and the time point t23, the requested fore and aft acceleration Gxr is approximately 0. Therefore, the correction coefficient K is maintained at 1 by the first correction coefficient setting unit 79 of FIG. 9, and the additional deceleration Gxadd calculated by the additional deceleration calculation unit 43 (FIG. 2) is forwarded to the additional braking force calculation unit 45 (FIG. 2) as it is. The fore and aft acceleration Gx of the vehicle 1 changes according to the added deceleration Gxadd which depends on the steer drag differential value d/dt GxD, in addition to the deceleration due to the steer drag.

When the accelerator opening Ap is at a high level so as to accelerate the vehicle 1 between the time point t31 and the time point t34, the requested fore and aft acceleration Gxr is a large positive value. Therefore, the correction coefficient K is maintained at a predetermined value a which is larger than 0 and smaller than 1 by the first correction coefficient setting unit 79 in FIG. 9. As a result, the additional deceleration Gxadd calculated by the additional deceleration calculation unit 43 (FIG. 2) is weakly corrected (to a value having a small absolute value) by the correction coefficient K which is at the predetermined value a.

When the brake pedal stroke Bp is so large as to decelerate the vehicle 1 between the time point t41 and the time point t44, the requested fore and aft acceleration Gxr becomes a negative value having a large absolute value. Therefore, the correction coefficient K is maintained at 0 by the first correction coefficient setting unit 79 shown in FIG. 9. As a result, the additional deceleration Gxadd calculated by the additional deceleration calculation unit 43 (FIG. 2) is corrected to 0 by the correction coefficient K, and the fore and aft acceleration Gx of the vehicle 1 changes only according to the deceleration due to the steer drag.

As described above, the control device 31 shown in FIG. 2 includes the correction coefficient setting unit 46 that sets the correction coefficient K for weakening the additional deceleration Gxadd. It should be noted that, when the fore and aft force and the fore and aft acceleration are compared, the fore and aft acceleration is more readily perceived by the driver. As shown in FIG. 9, the correction coefficient setting unit 46 of the present embodiment calculates the requested fore and aft acceleration Gxr according to the requested fore and aft force Fxr (=Fdr+Fbr) for the vehicle 1, and sets the correction coefficient K for weakening the velocity Gxadd according to the requested fore and aft acceleration Gxr. The additional deceleration correction unit 44 in FIG. 2 corrects the additional deceleration Gxadd by the correction coefficient K based on the requested fore and aft acceleration Gxr, instead of the requested fore and aft force Fxr. As a result, the fore and aft acceleration Gx of the vehicle 1 to which the additional deceleration Gxadd is added at the initial stage of cornering is perceived by the driver as being natural so that the discomfort that can be caused by the fore and aft acceleration Gx is minimized. In addition, the tunability of the vehicle control system 30 is improved.

As described above, the requested fore and aft force Fxr includes a requested driving force Fdr (FIG. 9) that requests acceleration of the vehicle 1 and a requested braking force Fbr (FIG. 9) that requests deceleration of the vehicle 1. Therefore, the correction coefficient K is set based on the requested fore and aft force Fxr including the requested driving force Fdr and the requested braking force Fbr. As a result, the additional deceleration Gxadd is appropriately corrected according to the driver's intention to accelerate or decelerate.

For example, when the driver depresses both the accelerator pedal and the brake pedal at the same time, if the correction coefficient K based on the requested driving force Fdr and the correction coefficient K based on the requested braking force Fbr are individually set, the two versions of the correction coefficient K are required to be mediated (such as low select process). On the other hand, in the present embodiment, as discussed above with reference to FIG. 9, the correction coefficient K is set based on the requested fore and aft force Fxr including the requested driving force Fdr and the requested braking force Fbr. Since the correction is based on the fore and aft force Fxr for the vehicle 1 requested by the driver, the correction process is simplified.

Further, as described above, the requested fore and aft force Fxr includes the operator-requested fore and aft force Fxo generated by the driver's operation and the control-requested fore and aft force Fxc not generated by the driver's operation. Therefore, the correction coefficient K is set based on the requested fore and aft force Fxr including the operator-requested fore and aft force Fxo by the driver's operation such as pedal operation and the control-requested fore and aft force Fxc requested by the ADAS or the like, instead of the driver's operation. This allows the additional deceleration Gxadd to be controlled without causing any discomfort to the driver due to an unanticipated behavior of the vehicle 1.

For example, when the ACC is in operation, and the distance to the preceding vehicle increases, the ACC will request acceleration, and the driver expects the vehicle 1 to accelerate automatically in a corresponding manner. In a situation where the front wheels 4A are steered while the ACC is requesting acceleration, if the correction coefficient K is set based solely on the operator-requested fore and aft force Fxo due to the driver's operation, the additional deceleration Gxadd is applied to the vehicle 1 without being weakened. As a result, the driver may experience discomfort due to the difference between the expected behavior of the vehicle 1 and the actual behavior of the vehicle. On the other hand, as in this embodiment of the present invention, when the correction coefficient K is set by the requested fore and aft force Fxr that includes the control-requested fore and aft force Fxc, the additional deceleration Gxadd will be weakened in this situation. Therefore, the behavior of the vehicle 1 does not deviate from the expectation of the driver so that the discomfort that the driver may experience is minimized.

FIG. 11 is a time chart showing another calculation example of the additional deceleration Gxadd. In this example, the correction coefficient setting unit 46 of FIG. 9 employs the second correction coefficient calculation unit 70 to set the correction coefficient K. However, the accelerator opening Ap is maintained at a small value that is required to keep the vehicle speed V constant (in other words, the requested fore and aft acceleration Gxr is kept at approximately 0), and the first correction coefficient calculation unit 69 in FIG. 9 sets the correction coefficient K to 1.

From the time point t51 to the time point t56, the additional deceleration Gxadd is generated according to the change in the control lateral acceleration Gy after the dead zone processing by the operation of the steering wheel 17. However, the lateral jerk Jy has not reached the weakening correction region set in a region where the absolute value of the lateral jerk Jy is larger than the predetermined value b (FIG. 9). Therefore, the additional deceleration Gxadd is calculated as the same value before and after the correction by the correction coefficient K between the time point t51 and the time point t52, between the time point t53 and the time point t54, and between the time point t55 and the time point t56 or during the time intervals each corresponding to an early stage of a cornering maneuver.

Also between the time point t61 and the time point t68, the additional deceleration Gxadd is generated according to the change in the control lateral acceleration Gy after the dead zone processing by the operation of the steering wheel 17. Since the lateral jerk Jy does not reach the weakening correction region during the time interval between the time point t61 and the time point t62, the additional deceleration Gxadd is calculated as the same value before and after the correction by the correction coefficient K. On the other hand, when the lateral jerk Jy reaches the weakening correction region at the time point t63, the lateral jerk correction coefficient Kj is set to a value smaller than 1. The additional deceleration Gxadd is generated during the time interval between the time point t64 and the time point t65, but the additional deceleration Gxaddd is corrected by the lateral jerk correction coefficient Kj so as to be weakened.

As described above, the correction coefficient setting unit 46 of FIG. 9 sets the lateral jerk correction coefficient Kj so that the lateral jerk correction coefficient Kj gets larger as the lateral jerk Jy decreases, and corrects the correction coefficient K by the lateral jerk correction coefficient Kj. Therefore, when the driver performs a sudden steering operation while depressing the accelerator pedal or the brake pedal, the correction coefficient K is corrected to be smaller so that the additional deceleration Gxadd applied to the vehicle 1 is weakened. As a result, the stability and controllability of the vehicle 1 are ensured.

Further, although the absolute value of the lateral jerk Jy is equal to or less than the predetermined value b at the time point t64 in FIG. 11, the switching processing unit 84 in FIG. 9 continues to produce the previous value of the lateral jerk correction coefficient Kj until the time point t65 at which the additional deceleration Gxaddd becomes 0. Therefore, between the time point t64 and the time point t65, the jerk correction coefficient Kj is held at a constant value, and corrects the jerk so as to be weakened. Even during the time interval between the time point t66 and the time point t68, the jerk correction coefficient Kj is held at a constant value, and corrects the additional deceleration Gxadd so as to be weakened, similarly as during the time interval between the time point t63 and the time point t65.

When the additional deceleration Gxadd is not 0 and the reset flag F is 1 as described above, the correction coefficient setting unit 46 corrects the correction coefficient K according to the smaller of the lateral jerk correction coefficient Kj based on the lateral jerk Jy and the previous lateral jerk correction coefficient Kj. By performing such a switching process by using the correction coefficient setting unit 46, the lateral jerk correction coefficient Kj is prevented from increasing during the time intervals between the time point t65 and the time point t66, and between the time point t67 and the time point t68, or during the time intervals where a series of additional decelerations Gxadd are outputted. Therefore, the controllability is prevented from being impaired by the increase and decrease of the lateral jerk correction coefficient Kj while a series of values of the jerk decelerations Gxadd are being outputted.

During the time interval between the time point t71 to the time point t72, the lateral jerk correction coefficient Kj is generally held at a value smaller than 1 and larger than 0, and the additional deceleration Gxadd is corrected so as to be weakened, similarly as during the interval between the time point t65 and the time point t66. On the other hand, during the time intervals between the time point t72 and the time point t73, and between the time point t73 and the time point t74, the lateral jerk correction coefficient Kj is generally held at 0, and the additional deceleration Gxadd is corrected so as to be weakened to 0. When the correction coefficient setting unit 46 did not perform the switching process, the additional deceleration Gxaddd would have changed significantly as the jerk correction coefficient Kj changes from 0 to 1 as shown by the broken line. In the present embodiment, even in such a situation, the lateral jerk correction coefficient Kj is held in value by the correction coefficient setting unit 46 owing to the switching process so that the controllability of the vehicle 1 is prevented from being impaired by fluctuations in the lateral jerk correction coefficient Kj while a series of additional deceleration Gxadd are being outputted.

Also, the specific configurations and arrangements of each member or portion, quantity, angle, calculation formula, etc. can be appropriately changed within the scope of the present invention. Further, the components shown in the above embodiments are not entirely indispensable, but can be appropriately selected, omitted and substituted.

The invention claimed is:
1. A vehicle control system, comprising:
a braking force generating device (6, 22) configured to generate a braking force to shift a load of a vehicle to a side of front wheels thereof at an initial stage of a cornering;
a control device (31) configured to control the braking force generated by the braking force generating device; and
a vehicle state information acquisition device (33, 34) configured to acquire vehicle state information including at least a traveling speed of the vehicle and a steering angle of the front wheels, the vehicle state information acquisition device comprising a vehicle speed sensor that detects a traveling speed of the vehicle, and at least one of a steering angle sensor that detects a steering angle of the front wheels and a steering angular velocity sensor that detects the steering angular velocity;
wherein the control device includes
an additional deceleration calculation unit (43) that calculates an additional deceleration (Gxadd) to be generated in the vehicle according to the vehicle state information,
a correction coefficient setting unit (46) that calculates a requested fore and aft acceleration (Gxr) according to a requested fore and aft force (Fxr) for the vehicle, and obtains a correction coefficient (K) for weakening the additional deceleration according to the requested fore and aft acceleration, an additional deceleration correction unit (44) that corrects the additional deceleration by the correction coefficient, and an additional braking force calculation unit (45) that calculates an additional braking force (Fbadd) to be generated by the braking force generating device according to the additional deceleration corrected by the additional deceleration correction unit, wherein the control device causes the braking force generating device to generate the additional braking force calculated by the additional braking force calculation unit, and wherein the requested fore and aft force (Fxr) includes an operator-requested fore and aft force (Fxo) requested by a driver's operation and a control-requested fore and aft force (Fxc) requested by an onboard device.

2. The vehicle control system according to claim 1, wherein the requested fore and aft force (Fxr) includes a requested driving force (Fdr) that requests acceleration of the vehicle and a requested braking force (Fbr) that requests deceleration of the vehicle.

3. A vehicle control system, comprising:
a braking force generating device (6, 22) configured to generate a braking force to shift a load of a vehicle to a side of front wheels thereof at an initial stage of a cornering;
a control device (31) configured to control the braking force generated by the braking force generating device; and
a vehicle state information acquisition device (33, 34) configured to acquire vehicle state information including at least a traveling speed of the vehicle and a steering angle of the front wheels, the vehicle state information acquisition device comprising a vehicle speed sensor that detects a traveling speed of the vehicle, and at least one of a steering angle sensor that detects a steering angle of the front wheels and a steering angular velocity sensor that detects the steering angular velocity;

wherein the control device includes an additional deceleration calculation unit (43) that calculates an additional deceleration (Gxadd) to be generated in the vehicle according to the vehicle state information, a correction coefficient setting unit (46) that calculates a requested fore and aft acceleration (Gxr) according to a requested fore and aft force (Fxr) for the vehicle, and obtains a correction coefficient (K) for weakening the additional deceleration according to the requested fore and aft acceleration, an additional deceleration correction unit (44) that corrects the additional deceleration by the correction coefficient, and an additional braking force calculation unit (45) that calculates an additional braking force (Fbadd) to be generated by the braking force generating device according to the additional deceleration corrected by the additional deceleration correction unit, wherein the control device causes the braking force generating device to generate the additional braking force calculated by the additional braking force calculation unit, and wherein the vehicle state information includes lateral jerk (Jy), and the correction coefficient setting unit (46) sets a lateral jerk correction coefficient (Kj) as a value that gets smaller as the lateral jerk increases, and corrects the correction coefficient (K) by the lateral jerk correction coefficient.

4. The vehicle control system according to claim 3, wherein the correction coefficient setting unit (46) determines if the additional deceleration is zero, and if the additional deceleration is not equal to zero, the correction coefficient is corrected by a smaller of the lateral jerk correction coefficient set based on the lateral jerk and a previous value of the lateral jerk correction coefficient.

* * * * *